Feb. 17, 1959 J. R. TAVIS 2,874,353
SUSPENSION GALVANOMETER
Filed Oct. 19, 1953

INVENTOR.
JOHN R. TAVIS
BY James B Christie
ATTORNEY

2,874,353

SUSPENSION GALVANOMETER

John R. Tavis, Los Angeles, Calif., assignor, by mesne assignments, to Consolidated Electrodynamics Corporation, Pasadena, Calif., a corporation of California Application October 19, 1953, Serial No. 386,980

1 Claim. (Cl. 324—97)

This invention relates to galvanometers of the type adapted to respond to alternating or oscillating voltages, and more particularly to the type of laboratory and portable galvanometers used for recording alternating voltage oscillations.

Galvanometers of this type have been in use for a considerable time in recording cameras and the like. Such galvanometers commonly comprise a lightweight coil suspended between the poles of a magnet by means of a pair of suspension wires or ribbons. The fluctuating voltage to be indicated by the galvanometer is connected to the coil terminals so that the coil oscillates accordingly. A mirror attached to the suspension wire responds according to the oscillations of the coil so that a light beam reflected from the mirror correspondingly oscillates back and forth on a surface against which it is directed. According to a common practice, such a galvanometer is often placed in a camera, usually with a number of other similar galvanometers, and a photographic film or paper strip is moved while the oscillating reflected light beam is on it so that a line or trace is made on the photographic strip, recording the oscillation of the mirror.

A common fault of galvanometers of this type is the presence of "mirror resonace." Due to the inherent inertia of the mirror and the resilience of the suspension in the region between the lower end of the coil and the upper end of the mirror, a resonant system exists which is extremely responsive to oscillations near the resonant frequency. The resonant frequency is determined by the constants of the system. Mirror resonance is objectionable in galvanometers because measurement of oscillating voltages of a frequency range near the mirror resonance frequency causes the mirror to oscillate with large amplitudes so as to indicate spurious voltage fluctuations.

Some galvanometer designs attempt to reduce mirror inertia to a minimum value by mounting the mirror in the axis of coil oscillation by means of straps around the mirror. This type of mounting is objectionable because it subjects the mirror to torque when the coil is oscillated. Such torque tends to warp or distort the mirror during oscillation and produces error in the path traced by the light beam reflected from the mirror.

The inherent inertia and elasticity of the coil contributes to mirror resonance and also introduces another undesirable effect in galvanometers known as "set effects." Set effects are due to excessive stresses imposed on the suspension system (including the coil) and are most likely to be produced in galvanometers for high frequency recording due to the required stiffness of the suspension means used in such galvanometers. Due to hysteresis in the suspension wires and the coil wire, the system is susceptible to permanent deformation induced by a degree of stress which may actually be encountered in use.

The invention is directed to minimizing mirror resonance, set effects, and mirror torque by reducing the elasticity of the coil and that part of the suspension system between the coil and the mirror. An additional advantage resulting from reduced coil elasticity is a corresponding increase in galvanometer sensitivity.

The invention contemplates provision in a galvanometer of an extremely lightweight and narrow coil held in suspension between a pair of stretched wires which constitute the axis of rotary movement of the coil. A stiffening member is rigidly attached to the coil and to a portion of one of the suspension wires near the coil. A mirror is rigidly mounted to rotate with the stiffened portion of the suspension wire. The coil is reinforced by stiffening members disposed longitudinally within the coil.

In a preferred form of the invention, suspension wire of circular cross-section is used and the stiffening member constitutes a small rigid tube supported snugly over the suspension wire. The tube and suspension wire are firmly bonded to each other, as by soldering. The mirror is preferably mounted in a notch in the tubular member so that the mirror lies near, but not in, the axis of coil rotation, and a comparatively rigid assembly is effectuated, including the coil, mirror and intervening suspension wire.

The foregoing and other features of my invention will be better understood from the following detailed description and the accompanying drawings in which.

The illustrations are of a fluid-damped galvanometer showing the applicability of the invention to this type of galvanometer. However, the invention is neither embodied in or limited to the specific damping means illustrated.

Figure 1:
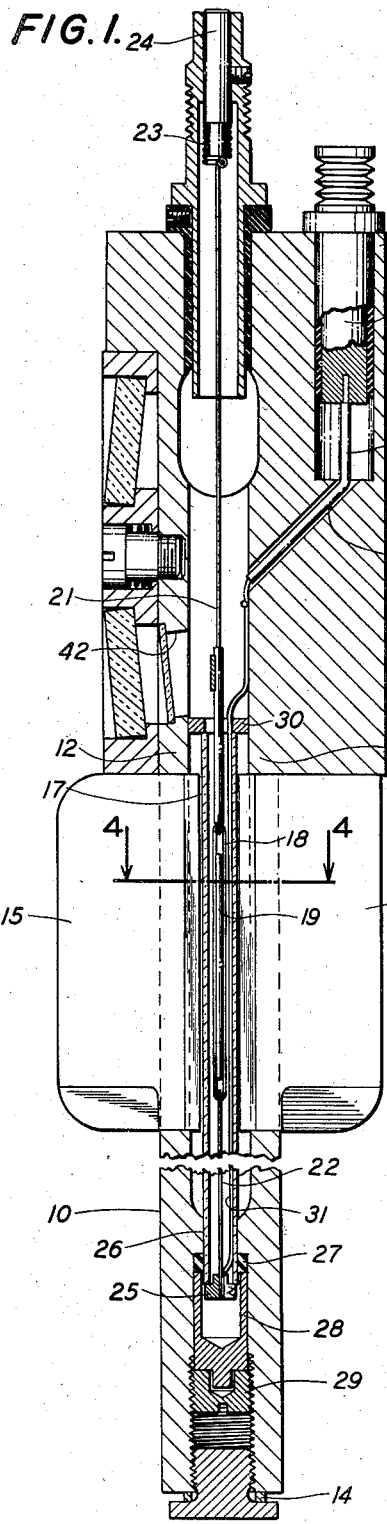
Fig. 1 is a sectional elevation of a galvanometer according to my invention.
Figure 2:
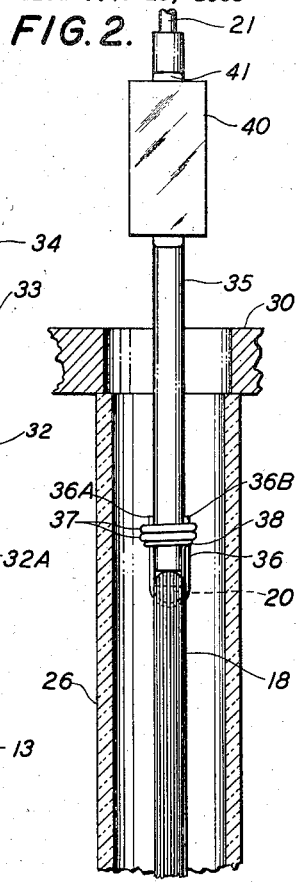
Fig. 2 is an enlarged front elevation of a portion of the suspended assembly of the galvanometer of Fig. 1.
Figure 3:
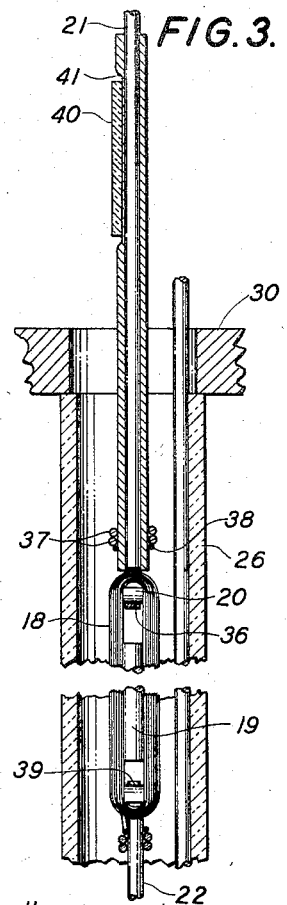
Fig. 3 is an enlarged side elevation of a portion of the assembly shown in Fig. 1.
Figure 4:
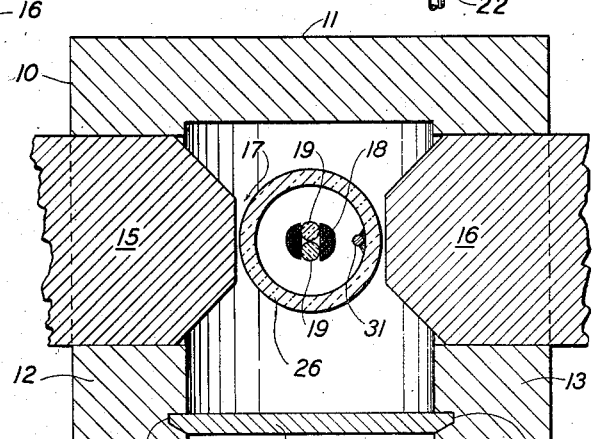
Fig. 4 is a transverse section taken on line 4—4 of Fig. 1.

Referring to the galvanometer shown in Figs. 1 to 4, the instrument comprises a case 10 in the form of a square or rectangular prism whose length is many times greater than its cross-sectional dimension. The case includes an elongated back-side 11 and two sides 12 and 13. A cover 14 is adapted to be put on or taken off by sliding it in grooves 12A and 13A formed internally in sides 12 and 13. A pair of pole pieces 15 and 16 are fastened through the sides 12 and 13 of the case. These are rigidly fastened in position in the case so as to leave a narrow elongated gap 17 between the two pole pieces in a central location in the case as shown in Fig. 1 and Fig. 4.

An elongated coil 18 of fine wire shaped to occupy a very small cross-sectional area is suspended within the gap between the poles pieces. The coil is shown in detail in Figs. 2, 3 and 4. It is composed of a fine insulated wire, such as No. 48 enameled, or even smaller, and may be on an arbor formed suitable for winding such fine wire. The winding is preferably done in such a manner that the coil is substantially cylindrical in form with a circular cross-section. The wires forming this coil are preferably cemented together so that the coil maintains a self-supporting form. The coil may conveniently be about .5 inch in length and of a diameter of about .015 inch in circular cross-section. The center portion of the coil is reinforced by elongated stiffening elements 19 positioned longitudinally within the coil and bonded to the coil with cement. Conveniently, the stiffening elements are of a light material, such as quartz or glass, and are shaped to give the entire coil assembly approximately a circular cross-section. The orientation of the stiffening rods to this end is shown in Fig. 4.

A semi-circular arbor 20 in the form of a half disc is inserted inside each extremity of the coil with the straight edge of the member at the loop of the coil. These arbors are shown in detail in Figs. 2 and 3. The arbors are preferably of insulating material to avoid danger of short-circuiting the coil turns.

The coil is suspended within the air gap between an upper suspension wire 21 and a lower suspension wire 22. The suspension wires may conveniently be No. 40 beryllium copper wire. The upper end of the upper suspension wire is anchored to a tension spring 23 which in turn is anchored to a central terminal post 24 sealed through the upper end of the case. The central terminal post provides one external contact for the coil. The detailed construction of the terminal post and the manner of mounting it through the end of the case forms no part of the present invention. The lower end of the lower suspension wire is soldered to a conductive cap 25 fitted over the lower end of a damping tube 26 which is disposed longitudinally within the galvanometer case coaxially around the lower suspension wire, the coil, and a portion of the upper suspension wire. Conveniently, the tube is transparent and of an electrical insulating material such as glass. As pointed out above, the coil and stiffening elements within the coil are designed to have a cross-section approximating that of a circle. This reduces the tendency of the oscillating coil to "pump" a fluid (not shown) which fills the damping tube. Thus, a more nearly viscous damping of the coil is obtained. The lower end of the damping tube is sealed and secured to the case by means of a gasket 27, a cup 28, and a compression screw 29. The upper end of the tube bears against a washer 30 soldered within the case.

One end of a suitable insulated connecting wire 31 is soldered to the cap, and the other end of the wire is carried upwardly out the upper end of the tube. The wire is cemented inside the full length of the glass tube. The upper end of the wire is soldered to an insulated electrical lead 32 which passes through an opening 32A in the side wall 13 and is anchored to a side terminal post 33 positioned in a terminal box 34 formed integrally with the upper part of side wall 13. The side terminal post provides the second external contact for the coil. The details of the electrical lead, the side terminal box and the side terminal form no part of this invention.

Referring to Figs. 2 and 3 which show the details of the juncture between the upper suspension wire and the coil, a cylindrical stiffening tube 35 having an I. D. slightly larger than the diameter of the upper suspension wire is disposed coaxially over the lower portion of the suspension wire and adjacent to the coil. Rigid bonding between the suspension wire and the cylindrical tube is effected by filling the annulus between the two elements with a conductive bonding material, for example, solder. For convenience in construction, the upper suspension wire runs for substantially the entire length of the cylindrical tube, although for the purpose of this invention, the extension of the suspension wire into the tube can be just sufficient to accomplish the bond.

For the purpose of attaching the coil rigidly to the stiffening tube, a stirrup 36 is looped through the upper end of the coil and inside the arcuate surface of the upper arbor. The stirrup may be formed of any convenient material, such as beryllium copper strip. The two upper ends 36A, 36B of the stirrup are securely fastened to the stiffening tube by two turns 37 of bare copper wire and one turn 38 of the upper coil lead wrapped around the stirrup ends and cylindrical tube. Solder is then applied to the turns of wire, the stirrup, and the tube to insure permanent and rigid mounting of the tube to the coil.

The lower end of the coil is secured to the lower suspension wire by means of a stirrup 39 fastened directly to the suspension wire.

A mirror 40 is cemented in a notch 41 provided in the stiffening tube so that the mirror is a minimum distance from the axis of coil oscillation, and still not subjected to any appreciable torsional stress as the coil oscillates. The mirror is spaced vertically above the coil in alignment with a window 42 in side wall 12 of the case.

Use of a stiffening tube having an O. D. of about .010 inch and a length of about .230 inch, and a mirror .060 inch long, .030 inch wide, and .005 inch thick in the above described arrangement provides a suspension system for the coil and mirror which has a mirror resonance frequency in excess of 28,000 c. p. s., this being several times higher than mirror resonance frequency of presently conventional galvanometers. This frequency is well out of the frequency range ordinarily measured with galvanometers of this type, and it can be made even higher by the use of a larger stiffening member between the coil and the mirror.

I claim:

A galvanometer comprising an elongated coil having an open central section, a first suspension means rigidly attached to one end of the coil, a second suspension means rigidly attached to the other end of the coil, means for producing a magnetic field with lines of flux transverse to the longitudinal axis of the coil, first stiffening means rigidly attached to one end of the coil and the adjacent portion of the nearer suspension means, a mirror rigidly mounted on the first stiffening means, and elongated second stiffening means made of glass and disposed within the coil to substantially fill the open central section, the second stiffening means being firmly bonded for substantially the entire length of the second stiffening means to the coil.

References Cited in the file of this patent

UNITED STATES PATENTS

| | | |
|---|---|---|
| 1,397,441 | Miller | Nov. 15, 1921 |
| 1,587,010 | Coley | June 1, 1926 |
| 2,469,265 | Hathaway | May 3, 1949 |
| 2,510,585 | Kellogg | June 6, 1950 |
| 2,519,591 | Morrow | Aug. 22, 1950 |
| 2,535,065 | Heiland | Dec. 26, 1950 |